United States Patent
Lei et al.

(10) Patent No.: US 10,401,664 B2
(45) Date of Patent: Sep. 3, 2019

(54) CURVED SURFACE DISPLAY DEVICE

(71) Applicants: BOE TECHNOLOGY GROUP CO., LTD., Beijing (CN); Chongqing BoeOptoelectronics Technology Co., Ltd., Chongqing (CN)

(72) Inventors: Sijun Lei, Beijing (CN); Liang Gao, Beijing (CN); Hang Min, Beijing (CN); Fei Shang, Beijing (CN); Haijun Qiu, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 14/800,987

(22) Filed: Jul. 16, 2015

(65) Prior Publication Data

US 2016/0139450 A1    May 19, 2016

(30) Foreign Application Priority Data

Nov. 18, 2014  (CN) .......................... 2014 1 0657685

(51) Int. Cl.
*G02F 1/1333*  (2006.01)
*G02F 1/133*  (2006.01)

(52) U.S. Cl.
CPC .. *G02F 1/133308* (2013.01); *G02F 1/133305* (2013.01); *G02F 1/133* (2013.01); *G02F 2001/133314* (2013.01)

(58) Field of Classification Search
CPC ... G02F 1/133308; G02F 2001/133314; G02F 1/133305
See application file for complete search history.

(56) References Cited

U.S. PATENT DOCUMENTS

| | | | |
|---|---|---|---|
| 9,116,662 B1* | 8/2015 | Song | G06F 1/1601 |
| 2013/0155655 A1* | 6/2013 | Lee | H05K 5/03 |
| | | | 362/97.1 |

(Continued)

FOREIGN PATENT DOCUMENTS

| CN | 103823321 A | 5/2014 |
|---|---|---|
| CN | 103824518 A | 5/2014 |

(Continued)

OTHER PUBLICATIONS

Office Action from China Application No. 201410657685.7 dated Feb. 14, 2017.

(Continued)

*Primary Examiner* — Michael H Caley
*Assistant Examiner* — Jonathan Y Jung
(74) *Attorney, Agent, or Firm* — Calfee, Halter & Griswold LLP (57) ABSTRACT

The embodiment of the invention relates to the field of display technology, and provides a curved surface display device whose curvature can be adjusted flexibly after assembly. The curved surface display device may comprise a liquid crystal display module, and may also comprise at least one adjustment frame, each adjustment frame comprises a first portion and a second portion, both of the first portion and the second portion comprise a fixed end and a movable end, the fixed end of the first portion and the fixed end of the second portion are respectively attached to the two edges of the liquid crystal display module that are perpendicular to the horizontal direction in case of being viewed normally; an adjustment distance is present between the movable end of the first portion and the movable end of the second portion, the adjustment frame is provided with an adjustment screw which movably connects the movable end of the first portion and the movable end of the second portion; the adjustment (Continued)

frame is used for changing the size of the adjustment distance by regulating the adjustment screw, so as to vary the curvature of the liquid crystal display module. Embodiments of the invention may be used for manufacturing the curved surface display device.

7 Claims, 3 Drawing Sheets

(56) References Cited

U.S. PATENT DOCUMENTS

| | | | | |
|---|---|---|---|---|
| 2013/0207946 A1* | 8/2013 | Kim | ............... | G09G 3/3225 |
| | | | | 345/204 |
| 2014/0125913 A1* | 5/2014 | Lee | ............... | G02B 6/0093 |
| | | | | 349/58 |
| 2014/0226266 A1* | 8/2014 | Kang | ............ | H01L 51/0097 |
| | | | | 361/679.01 |
| 2014/0268584 A1* | 9/2014 | Song | ............... | H05K 7/02 |
| | | | | 361/728 |
| 2015/0331273 A1* | 11/2015 | Yu | ............... | G06F 1/1601 |
| | | | | 349/58 |
| 2015/0346537 A1* | 12/2015 | Yu | ............ | G02F 1/133308 |
| | | | | 349/60 |
| 2015/0355675 A1* | 12/2015 | Lv | ............... | G06F 1/1601 |
| | | | | 361/679.21 |

FOREIGN PATENT DOCUMENTS

| | | |
|---|---|---|
| CN | 103838036 A | 6/2014 |
| CN | 103901655 A | 7/2014 |
| CN | 103941456 | 7/2014 |
| CN | 104143296 A | 11/2014 |
| CN | 105023510 | 11/2015 |
| JP | 2013134295 A | 7/2013 |
| WO | 2011108848 A2 | 9/2011 |
| WO | 2012036389 A | 3/2012 |

OTHER PUBLICATIONS

Office Action from Chinese Patent Application No. 201410657685.7 dated Aug. 29, 2016.
Third Office Action from China Application No. 201410657685.7 dated Jul. 26, 2017.

* cited by examiner

CURVED SURFACE DISPLAY DEVICE

RELATED APPLICATIONS

The present application claims the benefit of Chinese Patent Application No. 201410657685.7, filed Nov. 18, 2014, the entire disclosures of which are incorporated herein by reference.

FIELD OF THE INVENTION

The invention relates to the field of display technology, and in particular, to a curved surface display device.

BACKGROUND OF THE INVENTION

In recent years, with continuous development of technology, a surface curved display device gradually appears in the market, whose display screen and backlight are both curved. Since the retina of human's eye is curved, transformation of "plane-curved surface-plane" need to be carried out in a user's brain when the user is viewing pictures on the plane screen of the plane display device. Whereas the display screen of the curved surface display device is curved, pictures can be mapped into the user's brain intuitively at the same angle, thus transformation for pictures need not to be performed by the brain, reducing the pressure of the brain. Also, because of the curved shape of the display screen of the curved surface display device, better viewing angles can be achieved at the both the left and right sides of the curved surface display device, thereby more natural and comfortable visual perception can be offered for the user.

In the prior art, in production of the curved surface display device, generally all components of the backlight are manufactured as curved shape, and then assembled into a curved surface backlight, lastly, a display screen which is plane originally is bent and mounted over the curved surface backlight. However, when using such process to manufacture a curved surface display device, the curvature of the backlight is invariable after the all components of the backlight are manufactured as curved shape, such that the curvature of the resulting curved surface display device is fixed, which cannot be adjusted flexibly, in turn personal requirement for the curvature of the curved surface display device by the user can not be satisfied.

SUMMARY OF THE INVENTION

Embodiment of the invention provides a curved surface display device, whose curvature can be adjusted flexibly after assembly.

Embodiments of the invention take technical solutions as follows.

A curved surface display device provided by an embodiment of the invention comprises a liquid crystal display module, the curved surface display device also comprises at least one adjustment frame, each adjustment frame comprises a first portion and a second portion, both of the first portion and the second portion comprise a fixed end and a movable end, the fixed end of the first portion and the fixed end of the second portion are respectively attached to the two edges of the liquid crystal display module that are perpendicular to the horizontal direction in case of being viewed normally; An adjustment distance is present between the movable end of the first portion and the movable end of the second portion, the adjustment frame is provided with an adjustment screw which movably connects the movable end of the first portion and the movable end of the second portion; The adjustment frame can be used for changing the size of the adjustment distance by regulating the adjustment screw, so as to vary the curvature of the liquid crystal display module.

In an embodiment, the liquid crystal display module may comprise a module backplane, the fixed end of the first portion and the fixed end of the second portion may be attached to the two edges of the module backplane of the liquid crystal display module that are perpendicular to the horizontal direction in case of being viewed normally.

In an embodiment, the adjustment frame may be made from metal plate.

In an embodiment, the at least one adjustment frame can be distributed axisymmetrically, the symmetry axis may be the horizontal symmetry axis of the liquid crystal display module in case of being viewed normally.

A curvature adjustment method for a curved surface display device is provided by another embodiment of the invention. The curved surface display device comprises a liquid crystal display module and at least one adjustment frame, each adjustment frame comprises a first portion and a second portion, both of the first portion and the second portion comprise a fixed end and a movable end, the fixed end of the first portion and the fixed end of the second portion are respectively attached to the two edges of the liquid crystal display module that are perpendicular to the horizontal direction in case of being viewed normally. An adjustment distance may be present between the movable end of the first portion and the movable end of the second portion, the adjustment frame may be provided with an adjustment screw which movably connects the movable end of the first portion and the movable end of the second portion. The adjustment frame may be used for changing the size of the adjustment distance by regulating the adjustment screw, so as to vary the curvature of the liquid crystal display module, the method may comprise steps as follows:

regulating the adjustment screw to reduce the adjustment distance;

applying external force to the liquid crystal display module when the adjustment distance is reduced, such that the liquid crystal display module approaches the adjustment frame.

In another embodiment, a curved surface display device comprising a liquid crystal display module is provided, the curved surface display device also comprises at least one adjustment frame, the body of each adjustment frame may comprise at least one via hole. A module backplane of the liquid crystal display module may comprise at least one screwed hole having female screw threads therein. The body of the adjustment frame is also provided with at least one adjustment screw, which may connect the body of the adjustment frame with the module backplane through the via hole and the screwed hole, an adjustment distance may be present between the bottom of the body of the adjustment frame and the module backplane, the adjustment screw may be provided with male screw threads that may match the female screw threads inside the screwed hole. The adjustment frame can be used for changing the size of the adjustment distance by rotating the adjustment screw, so as to vary the curvature of the liquid crystal display module.

In an embodiment, the two ends of the body of the adjustment frame respectively may cling to the two edges of the liquid crystal display module that are perpendicular to the horizontal direction in case of being viewed normally.

In an embodiment, the adjustment frame may be made from metal plate.

In an embodiment, the via holes in the adjustment frame can be distributed symmetrically about the center of the adjustment frame.

In an embodiment, the at least one adjustment frame are distributed axisymmetrically, the symmetry axis may be the horizontal symmetry axis of the liquid crystal display module in case of being viewed normally.

The curved surface display device provided by the embodiment of the invention may comprise an liquid crystal display module, and may also comprise at least one adjustment frame. Each adjustment frame may comprise a first portion and a second portion, both of which may comprise a fixed end and a movable end. The fixed end of the first portion and the fixed end of the second portion may be respectively attached to the two edges of the liquid crystal display module that are perpendicular to the horizontal direction in case of being viewed normally. There may be an adjustment distance between the movable end of the first portion and the movable end of the second portion. The adjustment frame may be also provided with an adjustment screw, which may movably connect the movable end of the first portion and the movable end of the second portion. The adjustment frame may be used for changing the size of the adjustment distance by regulating the adjustment screw, which may vary the curvature of the liquid crystal display module. The curved surface display devices provided by embodiments of the invention may change the size of the adjustment distance between the movable ends of the first portion and the second portion of the adjustment frame by means of the adjustment screw, thus, the size of the distance between the two edges of the liquid crystal display module respectively attached to the fixed ends of the first portion and the second portion of the adjustment frame can be changed, thereby varying the curvature of the liquid crystal display module. Compared with the prior art, the curvature of the liquid crystal display module can be adjusted flexibly, since the adjustment screw can be adjusted flexibly. In the prior art, in the manufacture of the curved surface display device, all the components of the backlight are needed to be formed into curved shape, then these components with curved shape are assembled into a curved surface backlight. However, fabricating and assembling the curved surface backlight is difficult, technical cost of such process is very high, and the yield of which is relatively low. Moreover, the plane display screen is easy to crumble when assembled onto the curved surface backlight, thus such assembling process faces great challenge. In contrast, the liquid crystal display modules of embodiments of the invention can be fabricated and assembled in a flat state, the curved surfaced display device can be obtained just by regulating the curvature of the plane liquid crystal display by means of the adjustment frame and the adjustment screw, therefore, such process is easy to operate and may has a relatively higher yield, during which the display screen is not easy to crumble.

BRIEF DESCRIPTION OF THE DRAWINGS

In order to illustrate the technical solutions of the embodiments of the invention more clearly, next, figures required for the embodiments of the invention will be described briefly. Apparently, the figures described below are only some examples of the invention, other figures can be obtained based on these figures by the skilled person in the art without any inventive efforts.

DETAILED DESCRIPTION OF THE INVENTION

In the following, technical solutions of the embodiments of the invention will be described clearly and completely with reference to the figures for the embodiments. Apparently, the embodiments described are just part of the possible embodiments of the invention, but not the entire embodiments. Based on current embodiments of the invention, other embodiments obtained by the skilled person in the art without inventive efforts belong to the claimed scope of the invention.

Figure 1:
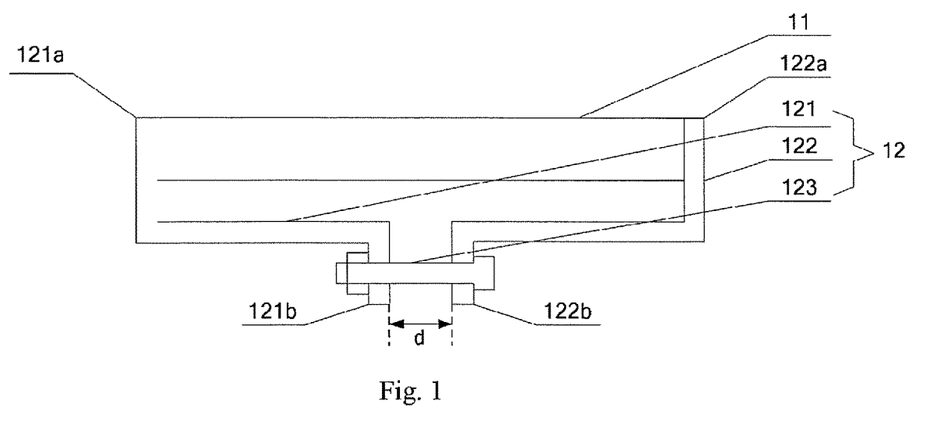
FIG. 1 schematically shows a cross section view of a curved surface display device without being bent provided by an embodiment of the invention in the direction perpendicular to its display plane.

As shown in FIG. 1, a curved surface display device is provided by an embodiment of the invention. The curved surface display device may comprise a liquid crystal display module 11 and at least one adjustment frame 12, each adjustment frame 12 may comprise a first portion 121 and a second portion 122. Both of the first portion 121 and the second portion 122 may comprise a fixed end and a movable end. The fixed end 121a of the first portion 121 and the fixed end 122a of the second portion 122 may be respectively attached to the two edges of the liquid crystal display module 11 that are perpendicular to the horizontal direction in case of being viewed normally. An adjustment distance d may be present between the movable end 121b of the first portion 121 and the movable 122b of the second portion 122. The adjustment frame 12 may also be provided with an adjustment screw 123, which may connect the movable end 121b of the first portion 121 and the movable end 122b of the second portion 122. The adjustment frame 12 can be used for changing the size of the adjustment distance d by regulating the adjustment screw 123, thus varying the curvature of the liquid crystal display module 11 by changing the size of the adjustment distance d.

It is noted that, the two edges of the liquid crystal display module 11 hereinafter refer to the two edges of the liquid crystal display 11 that are perpendicular to the horizontal direction in case of being viewed normally.

The fixed ends 121a and 122a of the adjustment frame 12 can be attached to the two edges of the liquid crystal display module 11 respectively. When the adjustment screw 123 is adjusted to reduce the adjustment distance d, the force applied on the movable ends 121b and 122b of the adjustment frame 12 will be transferred to the fixed ends 121a and 122a of the adjustment frame 12, which in turn acts on the two edges of the liquid crystal display module 11. Then the liquid crystal display module 11 may be bent due to the extrusion force from the two edges, thus the curvature of the liquid crystal display module 11 can be changed. The fixed ends 121a and 122a of the adjustment frame 12 can be attached to the two edges of the liquid crystal display module 11 in various ways, which is not limited by the embodiments of the invention, for example, the fixed ends 121a and 122a of the adjustment frame 12 can be embedded into the module backplane at the two edges of the liquid crystal display module 11, or the fixed ends 121a and 122a of the adjustment frame 12 can be welded to the module backplane at the two edges of the liquid crystal display module 11, alternatively, the fixed ends 121a and 122a of the adjustment frame 12 can also be fixed to the plastic frame of the liquid crystal display module 11. However, since the plastic frame of the liquid crystal display module 11 is a plastic injection part, which is easy to be deformed when suffered great pressure. While the module backplane of the liquid crystal display module 11 may be a metal part with strong compression resistance capability, hence it is preferred that the adjustment frame 12 is attached to the module backplane.

The adjustment frame 12 may be made from high-strength metal parts, thus it is difficult to be deformed under stress. For example, materials such as high-strength aluminium alloy, high-strength alloy steel or metal plate can be used to form the adjustment frame, which is not limited by the embodiments of the invention.

The liquid crystal display module 11 may comprise a liquid crystal display screen and a backlight component. It is noted that, the fabrication and assembly of the liquid crystal display screen and the backlight component of the liquid crystal display module 11 in the embodiments of the invention can be performed in a flat state, the operation difficulty is decreased and the production process is simple and convenient, compared to the case of the prior art in which a curved backlight is needed to be fabricated and assembled.

In this way, compared with the prior art, for the curved surface display devices provided by the embodiments of the invention, by means of the adjustment screw, the size of the adjustment distance between the movable ends of the first portion and the second portion of the adjustment frame can be changed, so that the size of the distance between the two edges of the liquid crystal display module respectively attached to the fixed ends of the first portion and the second portion of the adjustment frame, thereby varying the curvature of the liquid crystal display module. Since the adjustment screw can be adjusted flexibly, the curvature of the liquid crystal display module can be adjusted flexibly. In the prior art, in the manufacture of a curved surface display device, all the components of the backlight are needed to be formed into curved shape, then the components with curved shape are assembled into a curved surface backlight. However, fabricating and assembling the curved surface backlight is difficult, technical cost of such process is very high, and the yield of which is relatively low, moreover, the plane display screen is easy to crumble when assembled onto the curved surface backlight, thus such assembling process faces great challenge. In contrast, the liquid crystal display modules of embodiments of the invention can be fabricated and assembled under a flat state, in the manufacture of the curved surfaced display device, it is needed simply to vary the curvature of the plane liquid crystal display by means of the adjustment frame and the adjustment screw, therefore, such process is easy to operate and may has a relatively higher yield, during which the display screen is not easy to crumble.

Figure 2:
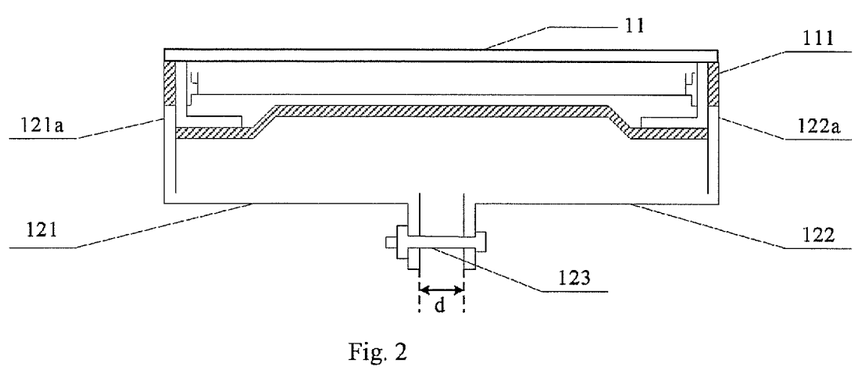
FIG. 2 schematically shows a cross section view of a curved surface display device without being bent provided by another embodiment of the invention in the direction perpendicular to its display plane.

Further, as shown in FIG. 2, the liquid crystal display module 11 may comprise a module backplane 111, the fixed end 121a of the first portion 121 and the fixed 122a of the second portion 122 may be respectively attached to the two edges of the module backplane 111 of the liquid crystal display module 11 that are perpendicular to the horizontal direction in case of being viewed normally.

The module backplane 111 may be used for supporting the backlight components and protecting the backlight components from being extruded. The module backplane 111 has relatively high strength, hence, it is not easy to be deformed even if under large extrusion force. Having attached the adjust frame 12 to the module backplane 111, when the adjustment distance d is reduced by regulating the adjustment screw 123, large extrusion force would be applied to the two edges of the liquid crystal display module 11 at the same time by the fixed end 121a of the first portion 121 and the fixed end 122a of the second portion 122 of the adjustment frame 12, thus, under the influence of the extrusion force, the curvature of the liquid crystal display module 11 may be changed, i.e. the liquid crystal display module 11 can be bent.

In an embodiment, the adjustment frame 12 may be made from metal plate.

Since the metal plate has advantages of high strength, light weight and low cost, it can be employed to manufacture the adjustment frame 12.

Further, at least one adjustment frame 12 can be axisymmetrically distributed, the symmetry axis may be the horizontal symmetry axis of the liquid crystal display module 11 in case of being viewed normally.

In practical application, the number of the adjustment frames 12 can be determined depending on the user's request or design requirement, which is not limited by embodiments of the invention. In an embodiment, the adjustment frames can be axisymmetrically distributed. For example, when only one adjustment frame 12 is arranged, the adjustment frame 12 may be arranged at the horizontal symmetry axis of the liquid crystal display module 11 in case of being viewed normally. When two adjustment frames 12 are arranged, the two adjustment frames may be symmetrically distributed about the horizontal symmetry axis of the liquid crystal display module 11 in case of being viewed normally. Similarly, a plurality of adjustment frames 12 can be symmetrically distributed, such arrangement may cause the two edges of the liquid crystal display module 11 to be under the same stress, therefore, the two edges of the liquid crystal display module 11 may have the same curve radian.

A curvature adjustment method for a curved surface display device is also provided by another embodiment of the invention. The method may comprise steps as follows:

Step 1: regulating the adjustment screw 123 to reduce the adjustment distance d.

Step 2: when the adjustment distance d is reduced, applying external force to the liquid crystal display module 11 such that the liquid crystal display module 11 approaches the adjustment frame 12.

Figure 3:
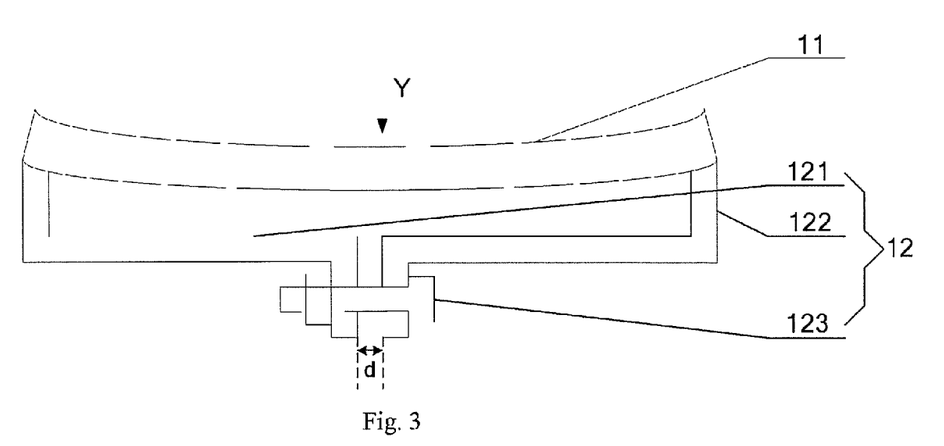
FIG. 3 schematically shows a cross section view of a curved surface display device that has been bent provided by an embodiment of the invention in the direction perpendicular to its display plane.

As shown in FIG. 1, in this case, the liquid crystal display module 11 is in a flat state, because the adjustment frame 12 does not apply force to the liquid crystal display module 11. When regulating the adjustment screw 123, i.e. further tightening the adjustment screw 123, the adjustment distance d will be reduced. At the same time of tightening the adjustment screw 123, external force in the Y direction can be applied to the liquid crystal display module 11 as shown in FIG. 3, then the liquid crystal display module 11 will be bent towards the direction to the adjustment frame 12. The Y direction shown in FIG. 3 may be the direction in which the liquid crystal display module 11 points to the adjustment frame 12.

The curved surface display device provided by embodiments of the invention may comprise a liquid crystal display module, and may also comprise at least one adjustment frame. Each adjustment frame may comprise a first portion and a second portion, both of which may comprise a fixed end and a movable end. The fixed end of the first portion and the fixed end of the second portion may respectively be attached to the two edges of the liquid crystal display module that are perpendicular to the horizontal direction in case of being viewed normally. There may be an adjustment distance between the movable end of the first portion and the movable end of the second portion. The adjustment frame may also be provided with an adjustment screw, which may movably connect the movable end of the first portion and the movable end of the second portion. The adjustment frame may be used for changing the size of the adjustment distance by regulating the adjustment screw, so as to vary the curvature of the liquid crystal display module. For the curved surface display devices provided by embodiments of the invention, the size of the adjustment distance between the movable ends of the first portion and the second portion of the adjustment frame may be changed by means of the adjustment screw, thus, the size of the distance between the two edges of the liquid crystal display module respectively attached to the fixed ends of the first portion and the second portion of the adjustment frame, thereby varying the curvature of the liquid crystal display module. Compared with the prior, the curvature of the liquid crystal display module can be adjusted flexibly, since the adjustment screw can be adjusted flexibly. In the prior art, in the manufacture of a curved surface display device, all the components of the backlight are needed to be formed into curved shape, then the components with curved shape are assembled into a curved surface backlight. However, fabricating and assembling the curved surface backlight is difficult, technical cost of such process is very high, and the yield of which is relatively low, moreover, the plane display screen is easy to crumble when assembled onto the curved surface backlight, thus such assembling process faces great challenge. In contrast, the liquid crystal display modules of embodiments of the invention can be fabricated and assembled in a flat state, the curved surfaced display device can be obtained just by adjusting the curvature of the plane liquid crystal display by means of the adjustment frame and the adjustment screw, therefore, such process is easy to operate and may has a relatively higher yield, during which the display screen is not easy to crumble.

Figure 4:
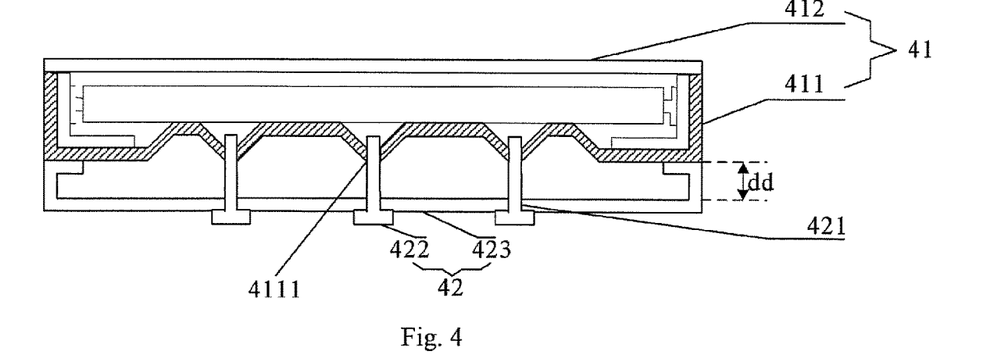
FIG. 4 schematically shows a cross section view of a curved surface display device without being bent provided by yet another embodiment of the invention in the direction perpendicular to its display plane.

In another embodiment of the invention, as shown in FIG. 4, a curved surface display device may comprise a liquid crystal display module 41. The curved surface display device may also comprise at least one adjustment frame 42. The body 423 of each adjustment frame 42 may comprise at least one via hole 421. A module backplane 411 of the liquid crystal display module 41 comprises at least one screwed hole 4111 having female screw threads therein. Also the body 423 of the adjustment frame 42 may be provided with at least one adjustment screw 422, which can connect the body 423 of the adjustment frame 42 with the module backplane 411 through the via hole 421 and the screwed hole 4111. An adjustment distance dd may be present between the bottom of the body 423 of the adjustment frame 42 and module backplane 411. The adjustment screw 422 is provided with male screw threads that matches the female screw threads inside the screwed hole 4111. The adjustment frame 42 may be used to change the size of the distance dd by rotating the adjustment screw 422, by which the curvature of the liquid crystal display module 41 can be varied.

The adjustment frame 42 may be provided with an adjustment screw 422, the liquid crystal display module 41 may comprise a liquid crystal display screen and a backlight 412 as well as the module backplane 411. The liquid crystal display screen, the backlight 412 and the module backplane 411 may be regarded as an integral part fixed together. As shown in FIG. 4, since the adjustment screw 422 in the adjustment frame 42 can be attached to the screwed hole 4111 of the module backplane 411 through the via hole 421, when the adjustment screw 422 is rotated to reduce the distance dd, the module backplane 411 attached to the adjustment frame 42 will be bent towards the direction to the adjustment frame 42, such that the liquid crystal display screen and the backlight 412 fixed to the module backplane 411 are also be bent towards the direction to the adjustment frame 42, in this way, the curvature of the liquid crystal display module can be changed.

In practical application, a plurality of adjustment frames 42 can be arranged, each of which may comprise multiple via holes 421. Specific number of the adjustment frame or via hole can be determined depending on actual situation, which is not limited by embodiments of the invention. Likewise, the module backplane 411 may have multiple screwed holes 4111, the adjustment frame 42 may comprise a plurality of adjustment screws 422, still, the specific number of the screwed holes or adjustment screws can be determined depending on actual situation, which is not limited by embodiments of the invention. The via hole 421, the screwed hose 4111 and the adjustment screw 422 can be arranged as a complete set, for which the numbers and positions thereof can correspond to each other.

The adjustment frame 42 may be made from high-strength metal parts, thus it is difficult to be deformed even if under stress. For example, materials such as high-strength aluminum alloy, high-strength alloy steel or metal plate can be used to form the adjustment frame, which is not limited by the embodiments of the invention.

The liquid crystal display screen and the backlight components of the liquid crystal display module 41 provided by the embodiment of the invention can be fabricated and assembled in a flat state, compared to the prior art in which a curved surface backlight and a curved surface liquid crystal display screen are needed to be fabricated and assembled, such simple and convenient process is easy to operate and may has a relatively higher yield.

Thus, for the curved surface display device provided by the embodiment of the invention, by means of the adjustment screw, the size of the adjustment distance between the bottom of the body of the adjustment frame and the module backplane can be changed, so that the curvature of the liquid crystal display module can be varied. Compared with the prior art, the curvature of the liquid crystal display module can be adjusted flexibly, since the adjustment screw can be adjusted flexibly. In the prior art, in the manufacture of a curved surface display device, all the components of the backlight are needed to be formed into curved shape, then the components with curved shape are assembled into a curved surface backlight. However, fabricating and assembling the curved surface backlight is difficult, technical cost of such process is very high, and the yield of which is relatively low, moreover, the plane display screen is easy to crumble when assembled onto the curved surface backlight, thus such assembling process faces great challenge. In contrast, the liquid crystal display modules of embodiments of the invention can be fabricated and assembled under a flat state, the curved surfaced display device can be obtained just by adjusting the curvature of the plane liquid crystal display by means of the adjustment frame and the adjustment screw, therefore, such process is easy to operate and may has a relatively higher yield, during which the display screen is not easy to crumble.

Figure 5:
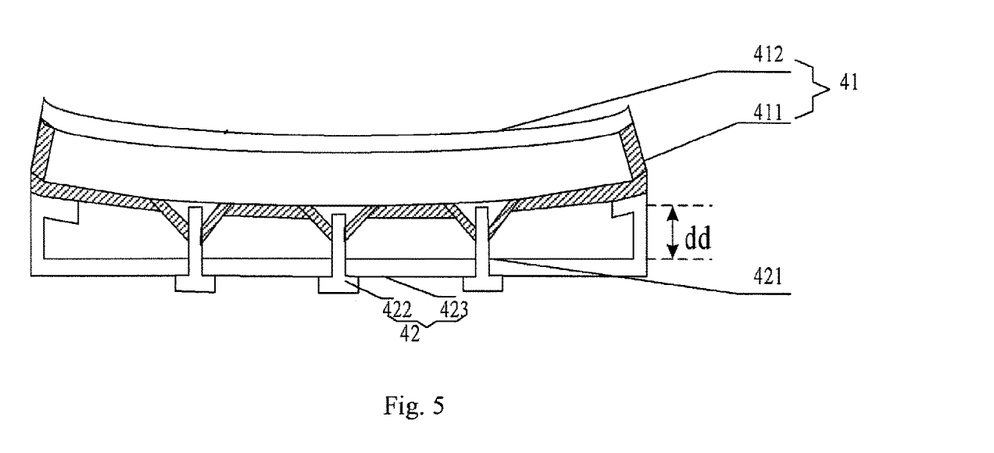
FIG. 5 schematically shows a cross section view of a curved surface display device that has been bent provided by yet another embodiment of the invention in the direction perpendicular to its display plane.

Further, as shown in FIG. 4 or FIG. 5, the two ends of the body 423 of the adjustment frame 42 may respectively cling to the two edges of the liquid crystal display module 41 that are perpendicular to the horizontal direction in case of being viewed normally.

It is noted that, the two edges of the liquid crystal display module 41 hereinafter refer to the two edges of the liquid crystal display 41 that are perpendicular to the horizontal direction in case of being viewed normally.

The "cling to" mentioned above means that the two ends of the body 423 of the adjustment frame 42 may be fixed to the two edges of the liquid crystal display module 41, or the two ends of the body 423 of the adjustment frame 42 may abut against the two edges of the liquid crystal display module 41, which is not limited by embodiments of the invention.

Due to the fact that the two ends of the body 423 of the adjustment frame 42 may respectively cling to the two edges of the liquid crystal display module 41, the adjustment screw 422 can be fixed better between the adjustment frame 42 and the module backplane 411. Also, when the adjustment screw 422 is adjusted, the two ends of the body 423 of the adjustment frame 42 may support the two edges of the liquid crystal display module 41, such that the middle portion of the liquid crystal display module 41 may be bent towards the adjustment frame 42, that is, the curvature of the liquid crystal display module 41 is varied.

In an embodiment, the adjustment frame 42 may be made from metal plate. Since the metal plate has advantages of high strength, light weight and low cost, it can be employed to manufacture the adjustment frame 12.

Further, as shown in FIG. 4, the via holes 421 in each adjustment frame 42 can be distributed symmetrically about the center of adjustment frame.

The number of the via holes 421 in the adjustment frame 42 can be determined depending on user's request or design requirement, which is not limited by embodiments of the invention. The distribution of the via holes 421 in the adjustment frame 42 can be symmetrical about the center, for example, in case that only one via hole 421 is arranged, the via hole 421 may be arranged in the middle of the adjustment frame 42; in case that tow via holes 421 are arranged, the two via holes 421 can be distributed symmetrically about the center line of the adjustment frame 42 as a symmetry axis. Similarly, multiple via holes 421 can be arranged symmetrically, such arrangement may cause the two edges of the liquid crystal display module 41 to be under the same stress, therefore, the two edges of the liquid crystal display module 41 may have the same curve radian.

In another embodiment, at least one adjustment frame 42 may be distributed axisymmetrically, the symmetry axis may be the horizontal symmetry axis of the liquid crystal display module in case of being viewed normally.

In practical application, the number of the adjustment frames 42 can be determined depending on specific request, which is not limited by embodiments of the invention. The distribution of the adjustment frames 42 can be axisymmetrical. For example, when only one adjustment frame 42 is arranged, the adjustment frame 42 may be arranged at the symmetry axis of the liquid crystal display module 41 in case of being viewed normally. When two adjustment frames 42 are arranged, distribution of the two adjustment frames may be symmetrical about the horizontal symmetry axis of the liquid crystal display module 41 in case of being viewed normally. Similarly, a plurality of adjustment frames 42 can be symmetrically distributed, such arrangement may cause the two edges of the liquid crystal display module 41 to be under the same stress, therefore, the two edges of the liquid crystal display module 41 may have the same curve radian.

The curved surface display device provided by the embodiment of the invention may comprise a liquid crystal display module, and also may comprise at least one adjustment frame, each adjustment frame may comprise at least one via hole. The module backplane of the liquid crystal display module may comprise at least one screwed hole having female screw threads therein. The adjustment frame may also comprise at least one adjustment screw, which can connect the body of the adjustment frame with the module backplane through the via hole and the screwed hole. There may be an adjustment distance between the bottom of the body of the adjustment frame and the module backplane. The adjustment screw is provided with male screw threads that match the female screw threads inside the screwed hole. The adjustment frame may be used to change the size of the adjustment distance by rotating the adjustment screw, by which the curvature of the liquid crystal display module can be varied. For the curved surface display device provided by the embodiment of the invention, the size of the adjustment distance between the bottom of the body of the adjustment frame and the module backplane can be changed by means of the adjustment screw, so that the curvature of the liquid crystal display module can be varied. Compared with the prior art, the curvature of the liquid crystal display module can be adjusted flexibly, since the adjustment screw can be adjusted flexibly. Moreover, in the prior art, in the manufacture of the curved surface display device, all the components of the backlight are needed to be formed into curved shape, then the components with curved shape are assembled into a curved surface backlight. However, fabricating and assembling the curved surface backlight is difficult, technical cost of such process is very high, and the yield is relatively low, moreover, the plane display screen is easy to crumble when assembled onto the curved surface backlight, thus such assembling process faces great challenge. In contrast, the liquid crystal display modules of embodiments of the invention can be fabricated and assembled under a flat state, a curved surfaced display device can be obtained just by adjusting the curvature of the plane liquid crystal display module by means of the adjustment frame and the adjustment screw, therefore, such process is easy to operate and may has a relatively higher yield, during which the display screen is not easy to crumble.

It should be understood that, in the embodiments provided by the present application, the disclosed device and method can by achieved in other different ways. That is, the embodiments described above are illustrative and exemplary. For example, division of the units is merely in the sense of logical function, there may be other division manner in practical implementation. For example, a plurality, of units or components may be combined or integrated into another system, or some features can be omitted or not be performed. Additionally, mutual coupling, direct coupling or communication link shown or discussed can be indirect coupling or communication link through some interfaces, apparatuses or units, and can be electrical, mechanical or other forms of coupling or link.

Above mentioned are merely the specific embodiments of the present invention, however, the protection scope of the invention is not limited by this. The variations or alternative embodiments achieved by the skilled person in the art within the technical scope disclosed by the invention should be encompassed by the protection scope of the invention. Therefore, the protection scope of the invention is defined by the appended claims.

The invention claimed is:

1. A curved surface display device comprising:
    a liquid crystal display module having a first vertical edge and a second vertical edge;
    at least one adjustment frame comprising:
        a first portion having a fixed end and a moveable end;
        a second portion having a fixed end and a moveable end;
        wherein the fixed end of the first portion is attached to the first vertical edge of the liquid crystal display module and the fixed end of the second portion is attached to the second vertical edge of the liquid crystal display module;
        an adjustment distance between the movable end of the first portion and the movable end of the second portion; and
        an adjustment screw which movably connects the movable end of the first portion and the movable end of the second portion;
    wherein adjusting the adjustment screw changes the adjustment distance, causing the adjustment frame to alter a curvature of the liquid crystal display module; and
    wherein the curvature of the liquid crystal display module increases with a decrease of the adjustment distance.

2. The curved surface display device of claim 1, wherein:
    the liquid crystal display module comprises a module backplane having a first vertical edge and a second vertical edge; and
    the fixed end of the first portion is attached to the first vertical edge and the fixed end of the second portion is attached to the second vertical edge.

3. The curved surface display device of claim 1, wherein the adjustment frame is made from metal plate.

4. The curved surface display device of claim 2, wherein the adjustment frame is made from metal plate.

5. The curved surface display device of claim 1, wherein the at least one adjustment frame are axisymmetrically distributed relative to a horizontal symmetry axis of the liquid crystal display module.

6. The curved surface display device of claim 2, wherein the at least one adjustment frame are axisymmetrically distributed relative to a horizontal symmetry axis of the liquid crystal display module.

7. A curvature adjustment method for a curved surface display device comprising:
    providing a curved surface display device comprising:
        a liquid crystal display module having a first vertical edge and a second vertical edge;
        at least one adjustment frame comprising:
            a first portion having a fixed end and a moveable end;
            a second portion having a fixed end and a moveable end;
            wherein the fixed end of the first portion is attached to the first vertical edge of the liquid crystal display module and the fixed end of the second portion is attached to the second vertical edge of the liquid crystal display module;
        an adjustment distance between the movable end of the first portion and the movable end of the second portion; and
        an adjustment screw which movably connects the movable end of the first portion and the movable end of the second portion;
        wherein adjusting the adjustment screw changes the adjustment distance, causing the adjustment frame to alter a curvature of the liquid crystal display module; and
        wherein the curvature of the liquid crystal display module increases with a decrease of the adjustment distance;
    adjusting the adjustment screw to reduce the adjustment distance; and
    applying a force to the liquid crystal display module when the adjustment distance is reduced such that the liquid crystal display module approaches the adjustment frame.

* * * * *